United States Patent [19]

Okada et al.

[11] Patent Number: 4,958,915

[45] Date of Patent: Sep. 25, 1990

[54] LIQUID CRYSTAL APPARATUS HAVING LIGHT QUANTITY OF THE BACKLIGHT IN SYNCHRONISM WITH WRITING SIGNALS

[75] Inventors: Shinjiro Okada, Kawasaki; Tohru Takahashi, Tokyo; Hideyuki Kawagishi, Tokyo; Yutaka Inaba, Kawaguchi; Osamu Taniguchi, Kawasaki, all of Japan

[73] Assignee: Canon Kabushiki Kaisha, Japan

[21] Appl. No.: 309,974

[22] Filed: Feb. 13, 1989

Related U.S. Application Data

[63] Continuation of Ser. No. 881,384, Jul. 2, 1986, abandoned.

[30] Foreign Application Priority Data

| Jul. 12, 1985 | [JP] | Japan | 60-152320 |
| Oct. 21, 1985 | [JP] | Japan | 60-233563 |
| Oct. 21, 1985 | [JP] | Japan | 60-233564 |
| Oct. 21, 1985 | [JP] | Japan | 60-233565 |
| Oct. 29, 1985 | [JP] | Japan | 60-240663 |

[51] Int. Cl.$^5$ .......................................... G02F 1/133
[52] U.S. Cl. .................................... 350/345; 350/333; 350/350 S; 340/784
[58] Field of Search .................. 350/350 S, 332, 333, 350/345, 331 R; 340/784, 765, 805, 802; 346/108, 160, 170 R; 358/296

[56] References Cited

U.S. PATENT DOCUMENTS

| 3,575,491 | 4/1971 | Heilmeier | 350/332 |
| 3,585,629 | 6/1971 | Baynard | 340/715 |
| 3,790,850 | 2/1974 | Doane et al. | 390/802 |
| 3,973,254 | 8/1976 | Nonimiya et al. | 350/811 |
| 4,090,219 | 5/1978 | Ernstoff et al. | 350/331 R |
| 4,193,095 | 3/1980 | Mizushima | 340/802 |
| 4,443,695 | 4/1984 | Kitamura | 346/160 |
| 4,449,153 | 5/1984 | Tschang | 346/108 |
| 4,591,886 | 5/1986 | Umeda et al. | 350/350 S |
| 4,760,389 | 7/1988 | Aoki et al. | 350/345 |
| 4,791,418 | 12/1988 | Kawahara et al. | 350/331 R |
| 4,824,216 | 4/1989 | Perbet et al. | 350/345 |

FOREIGN PATENT DOCUMENTS

| 2141279 | 12/1984 | Japan | 350/333 |
| 0180373 | 9/1985 | Japan | 358/296 |
| 0260922 | 12/1985 | Japan | 350/345 |

Primary Examiner—Stanley D. Miller
Assistant Examiner—Tai V. Duong
Attorney, Agent, or Firm—Fitzpatrick, Cella Harper & Scinto

[57] ABSTRACT

A liquid crystal apparatus, comprising a liquid crystal panel comprising a plurality of scanning lines, and a plurality of picture elements disposed along each of the scanning lines and comprising a ferroelectric liquid crystal; a backlight disposed behind the liquid crystal panel for illuminating the liquid crystal panel, the backlight changing the light quantity emitted therefrom with the elapse of time. The liquid crystal apparatus is so driven that the low level of the light quantity of the backlight is synchronized with a time when a writing signal is applied to picture elements on at least one scanning line.

16 Claims, 18 Drawing Sheets dd
LIQUID CRYSTAL APPARATUS HAVING LIGHT QUANTITY OF THE BACKLIGHT IN SYNCHRONISM WITH WRITING SIGNALS This application is a continuation of application Ser. No. 881,384, filed July 2, 1986, now abandoned.

FIELD OF THE INVENTION AND RELATED ART

The present invention relates to a liquid crystal apparatus and a driving method therefor, and more particularly, to a liquid crystal apparatus comprising a liquid crystal panel sometimes abbreviated a "LC panel" provided with a ferroelectric liquid crystal and a backlight.

In recent years, development of a ferroelectric liquid crystal device has attracted much attention in place of a TN (twisted nematic) liquid crystal device which has been widely used hitherto. A ferroelectric liquid crystal device is caused to evidence bistability by appropriately constructing the cell and is expected to realize a liquid crystal display device of a high order of time division. However, the responsive characteristic of a ferroelectric liquid crystal device is governed by the product of a spontaneous polarization and an electric field, as different from the conventional TN liquid crystal device, and the threshold with respect to the response is determined by the product of an electric field intensity and the application time thereof. The bistability of the ferroelectric liquid crystal device can be provided by making the cell thickness sufficiently thin (3 microns or less), e.g., as proposed by Clark and Lagerwall in U.S. Pat. No. 4367924. This type of cell is known as a surface-stabilized ferroelectric liquid crystal cell (sometimes abbreviated as "SSFLC cell").

However, such a bistable ferroelectric liquid crystal cell involves a problem that it causes flickering on the display face as will be described in detail hereinafter.

SUMMARY OF THE INVENTION

An object of the present invention is to provide an liquid crystal apparatus and a driving method therefor without having flickering on the display face.

Thus, the present invention provides a liquid crystal apparatus, comprising: a liquid crystal panel comprising a plurality of scanning lines, and a plurality of picture elements disposed along each of the scanning lines and comprising a ferroelectric liquid crystal; a backlight disposed behind the liquid crystal panel for illuminating the liquid crystal panel, said backlight changing the light quantity emitted therefrom with the elapse of time; and means for synchronizing the low level of the light quantity of the backlight with a time when a writing signal is applied to picture elements on at least one scanning line.

Various embodiments of apparatus and method relating to the above objects are also provided.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

First of all, an embodiment of a liquid crystal cell used in the present invention is explained.

Figure 1:
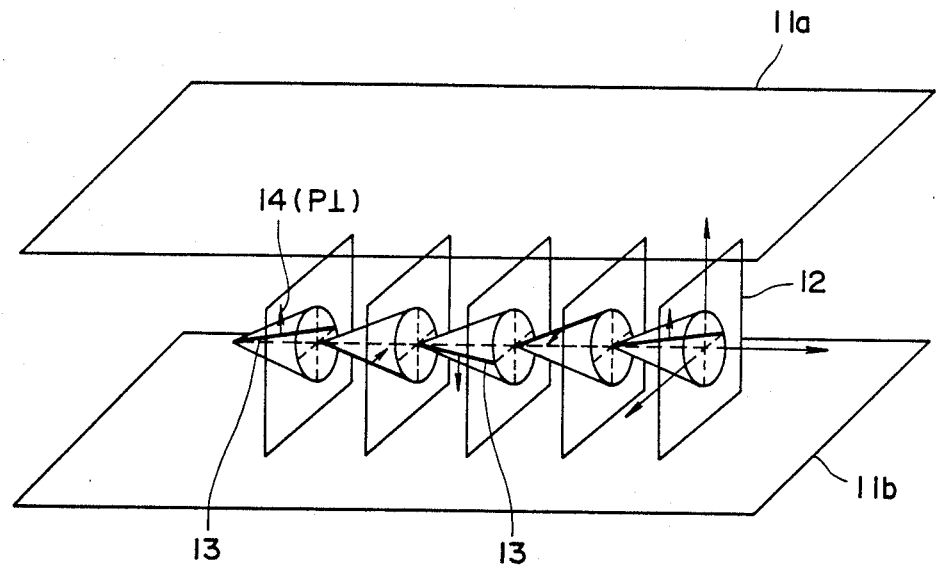
FIGS. 1 and 2 are schematic perspective views illustrating the basic operation principle of a ferroelectric liquid crystal device used in the present invention.
Figure 2:
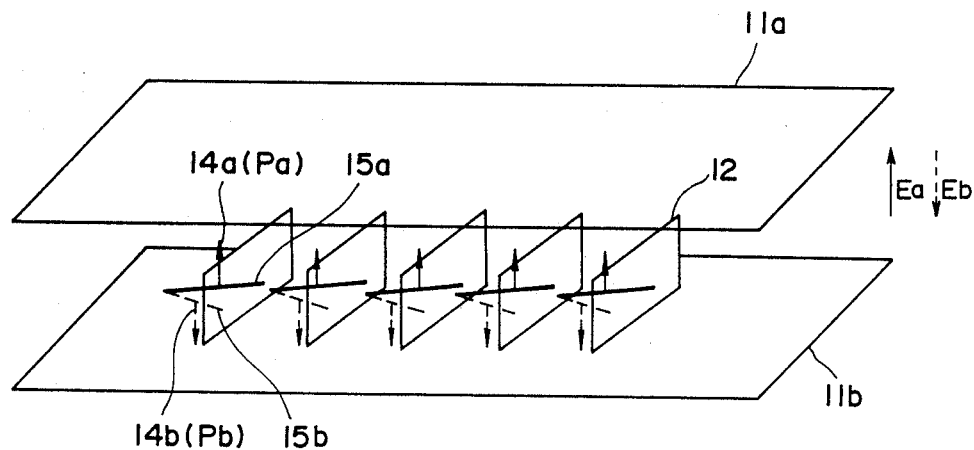

Referring to FIG. 1, there is schematically shown an example of a ferroelectric liquid crystal cell. Reference numerals 11a and 11b denote base plates (glass plate) on which a transparent electrode of, e.g., $In_2O_3$, $S_nO_2$, ITO (Intium-Tin-Oxide), etc., is disposed, respectively. A liquid crystal of an SmC*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11a and 11b, a helical or spiral structure of the liquid crystal molecule 13 is loosened or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device having optical characteristics which vary depending upon the polarity of an applied voltage. Further, when the thickness of the liquid crystal cell is sufficiently thin (e.g., 1 micron), the helical structure of the liquid crystal molecules is loosened without application of an electric field whereby the dipole moment assumes either of the two states, i.e., Pa in an upper direction 14a or Pb in a lower direction 14b, thus providing a bistability condition, as shown in FIG. 2. When an electric field Ea or Eb higher than a certain threshold level and different from each other in polarity as shown in FIG. 2 is applied to a cell having the above-mentioned characteristics, the dipole moment is directed either in the upper direction 14a or in the lower direction 14b depending on the vector of the electric field Ea or Eb. In correspondence with this, the liquid crystal molecules are oriented to either a first orientation state 15a or a second orientation state 15b.

When the above-mentioned ferroelectric liquid crystal is used as an optical modulation element, it is possible to obtain two advantages. Firstly, the response speed is quite fast. Secondly, the orientation of the liquid crystal shows bistability. The second advantage will be further explained, e.g., with reference to FIG. 2. When the electric field Ea is applied to the liquid crystal molecules, they are oriented in the first stable state 15a. This state is stably retained even if the electric field is removed. On the other hand, when the electric field Eb of which direction is opposite to that of the electric field Ea is applied thereto, the liquid crystal molecules are oriented to the second orientation state 15b, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, particularly 1 to 5 microns. A liquid crystal electrooptical device having a matrix electrode structure in which the ferroelectric liquid crystal of this kind is used is proposed, e.g., in the specification of Clark and Lagerwall U.S. Pat. No. 4,367,924.

As the ferroelectric liquid crystal having bistability used in the present invention, chiral smectic liquid crystals having ferroelectricity are most preferred. Among those liquid crystals, a liquid crystal in chiral smectic C phase (SmC*) or H phase (SmH*) is particularly suited. These ferroelectric liquid crystals are described in, e.g., "LE JOURNAL DE PHYSIQUE LETTERS" 36 (L-69), 1975 "Ferroelectric Liquid Crystals": "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compound used in the present invention are decyloxybenzylidene-p'-amino-2-methylbutylcinnamate (DOBAMBC), hexyloxybenzylidene-p'-amino-2-chloropropylcinnamate (HOBACPC), 4-o-(2-methyl)-butylresorcilidene-4'-octylaniline (MBRA 8), etc.

When a device is constructed using these materials, the device may be supported with a block of copper, etc. in which a heater is embedded in order to realize a temperature condition where the liquid crystal compounds assume an SmC*- or SmH*-phase.

Figure 3A:
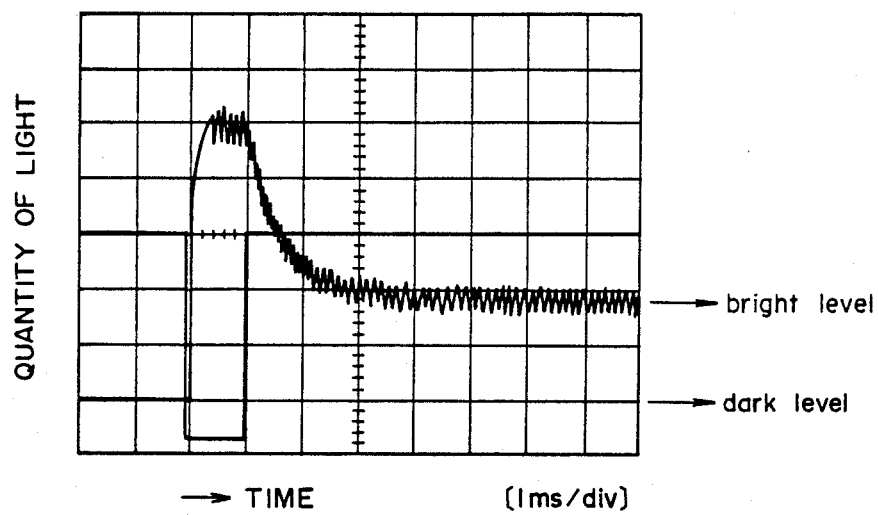
FIGS. 3A and 3B show optical characteristic charts of a ferroelectric liquid crystal device when pulses exceeding the threshold are applied thereto.
Figure 3B:
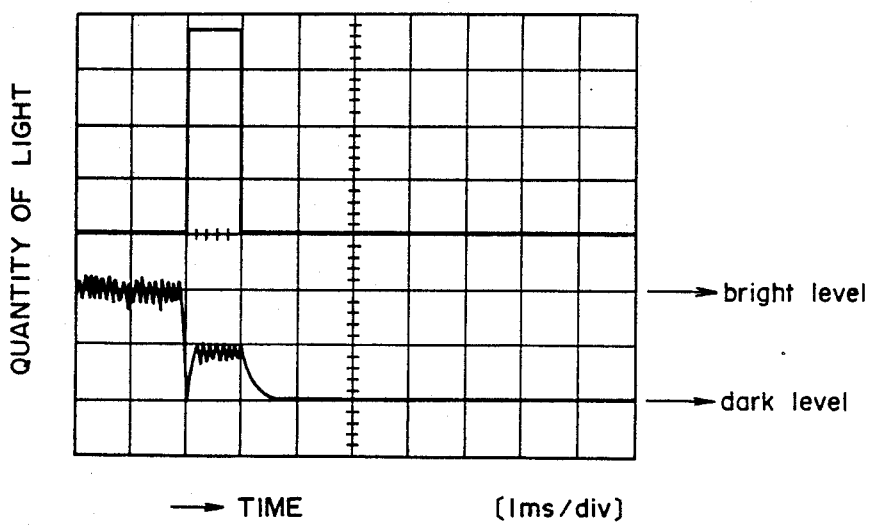

FIGS. 3A and 3B show curves illustrating a behavior of switching between such two stable states, wherein the quantity of light having passed through a liquid crystal cell (ordinate) is plotted against the elapse of time (abscissa). Above and below the liquid crystal cell, a pair of polarizers are respectively disposed, in the form of cross nicols so that the polarizing axis of one coincides with the alignment direction of the liquid crystal molecules, e.g., in the first stable state, whereby optically the first stable state is displayed at a dark level and the second stable state is disposed at a bright level. In this case, switching between the two stable states may be effected by using single pulses of mutually opposite polarities exceeding the threshold. More specifically, FIG. 3A shows switching from a "dark" state to a "bright" state, while FIG. 3B shows switching from a "bright" state to a "dark" state. In either case, switching between the two states, i.e., between the first or dark state and the second or bright state, does not smoothly occur but causes a transient overshooting and only then results in a desired stable state.

Such an overshooting phenomenon may be caused for the following reason. In a stable state, liquid crystal molecules are twisted in a liquid crystal molecular layer 12 in FIG. 2 so that they provide an apparently smaller tilt angle than the tilt angle (true tilt angle) which is provided under the state where liquid crystal molecules are aligned in parallel in a molecular layer. Thus, during the switching operation, liquid crystal molecules forming the true tilt angle under the application of an electric field may presumably shift to a stable twist state on an instant when the electric field is removed, so that an optical overshooting may occur. The occurrence of such a phenomenon means that when writing according to a line-sequential scanning scheme is effected by using an SSFLC cell having a matrix arrangement of scanning signal lines and information signal lines, the overshooting occurs at all the selected picture elements, resulting in visual flickering on the picture and considerably increasing the effort required to review the picture. Further, we have confirmed through psychological testing that such flickering on the picture occurs particularly upon switching from the bright state to the dark state.

Figure 4A:
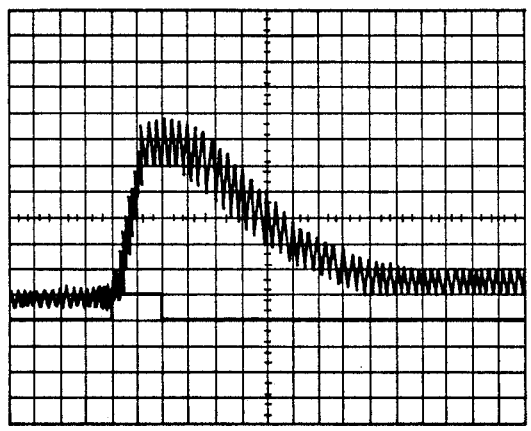
FIGS. 4A and 4B show optical characteristic charts of a ferroelectric liquid crystal device when pulses below the threshold are applied thereto.
Figure 4B:
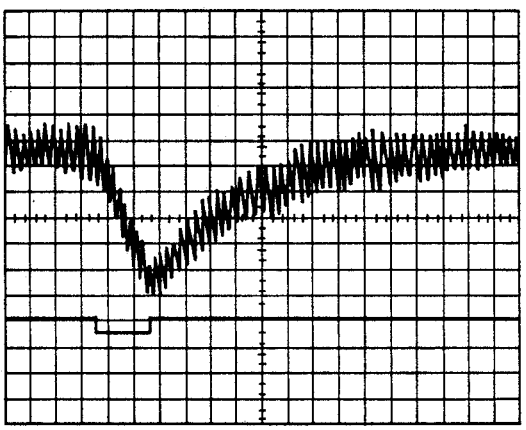

When the above-mentioned ferroelectric liquid crystal device is driven according to a matrix driving scheme, a display signal of +V or −V is applied from display signal lines to picture elements on scanning lines to which a scanning signal is not applied. We have further discovered that even when the voltage +V or −V is below a threshold level, the quantity of transmitted light temporarily changes while the voltage is applied. This is explained hereinbelow with reference to FIGS. 3 and 4. FIGS. 3 and 4 show changes in quantity of transmitted light with the elapse of time when pulse voltages of above and below a threshold are applied. When a pulse above a threshold is applied, a picture element in a light interrupting state shifts to a light transmitting state as shown in FIG. 3A, while a picture element in a light transmitting state shifts to a light interrupting state as shown in FIG. 3B. On the other hand, when a pulse below a threshold is applied, a picture element in a light interrupting state shifts instantaneously to assume a light transmitting state and again returns to a normal interrupting state as shown in FIG. 4A, while a picture element in a light transmitting state instantaneously decreases the quantity of transmitted light and then returns to a normal transmitting state.

Thus, in a scanning period, not only picture elements on a selected scanning line but all the picture elements cause a change in amount of transmitted light. Moreover, the quantity of light varies depending on the voltage applied to signal electrodes. As a result, there arises a problem that flickering occurs on the whole picture to provide a picture which is extremely difficult to review and may even provide ill effects to a viewer's eyes.

Figure 5A:
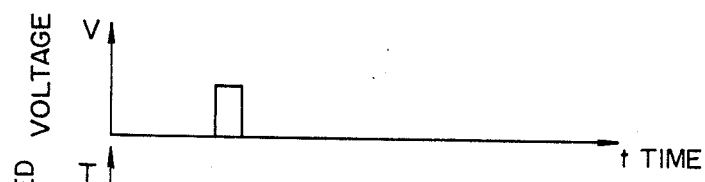
FIGS. 5A–5F show characteristic curves showing relationships between switching characteristics of a liquid crystal device and various optical characteristics of a light source.
Figure 5B:
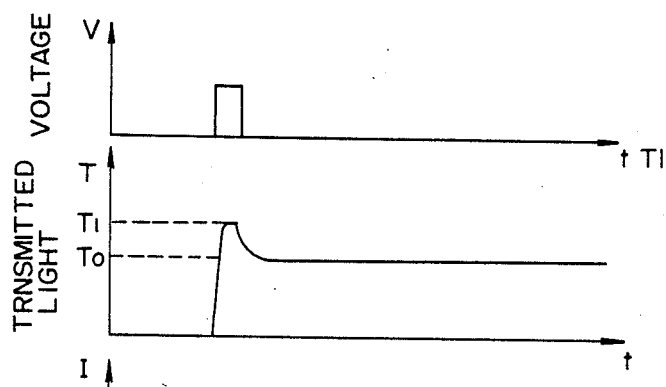
Figure 5C:
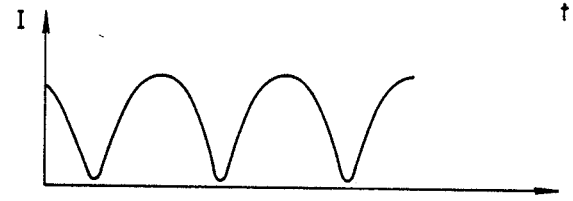
Figure 5D:
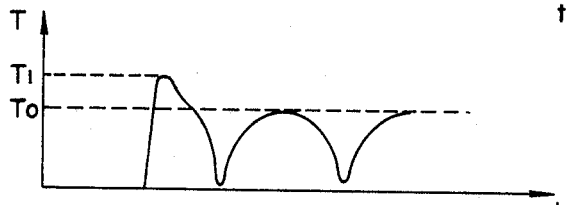
Figure 5E:
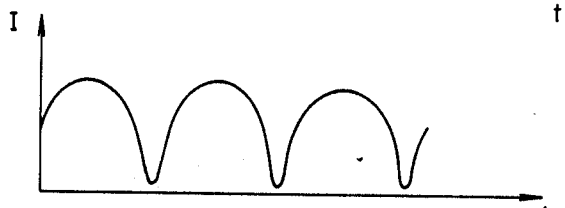
Figure 5F:
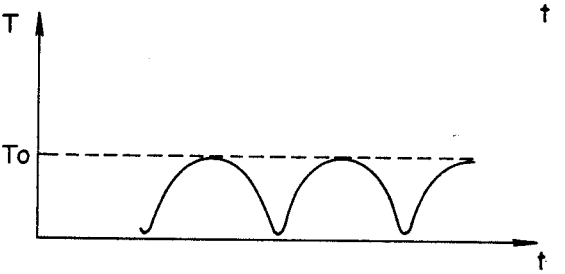

FIGS. 5A–5F are views, show changes in various characteristics of a liquid crystal cell and a light source along the progress of time. More specifically, FIG. 5A shows a driving voltage waveform applied to a cell or picture element of a liquid crystal panel; FIG. 5B a light transmitting characteristic of the cell when the voltage in FIG. 5A is applied; FIG. 5C a light quantity characteristic of a light source which is not in synchronism with the voltage waveform in FIG. 5A; FIG. 5D a light quantity characteristic of light transmitting through the cell at that time; FIG. 5E a light quantity characteristic of a back light source which is in synchronism with the driving voltage waveform in FIG. 5A; and FIG. 5F a change in light quantity transmitted through the cell at that time.

For example, when display is carried out by using a driving pulse as shown in FIG. 5A to a liquid crystal cell having a light transmitting characteristic shown in FIG. 5B in combination with a backlight of a uniform light quantity, a quantity of light exceeding the bright level in the memory state is transmitted to cause flickering on the picture. Further, when a light source having a periodicity in light quantity as shown in FIG. 5C (e.g., a fluorescent lamp, an incandescent lamp, etc.) is used, and the ON-OFF operation of a liquid crystal device is effected independently of the periodicity of the light source, the light quantity transmitted through the LC cell instantaneously exceeds an average level $T_0$ to reach an abnormal light quantity $T_1$, so that flickering on the picture occurs similarly as in the previous example. Such phenomena cause a remarkable decrease in display quality.

It contrast thereto, in an embodiment according to the present invention, as shown in FIG. 5E, the timing when a light source increases its light quantity is caused to coincide with the timing when the transmissivity of a LC cell instantaneously increases as shown in FIG. 5C, whereby the instantaneous increase in light quantity may be prevented as shown in FIG. 5E to avoid flickering on the picture at the time of writing. In this instance, if the quantity of light periodically changes as shown in FIG. 5C, a sufficient effect of preventing flickering of picture may be attained even if the light quantity does not decrease to the proximity of 0. For example, decrease to about 50% may be sufficient.

Figure 6:
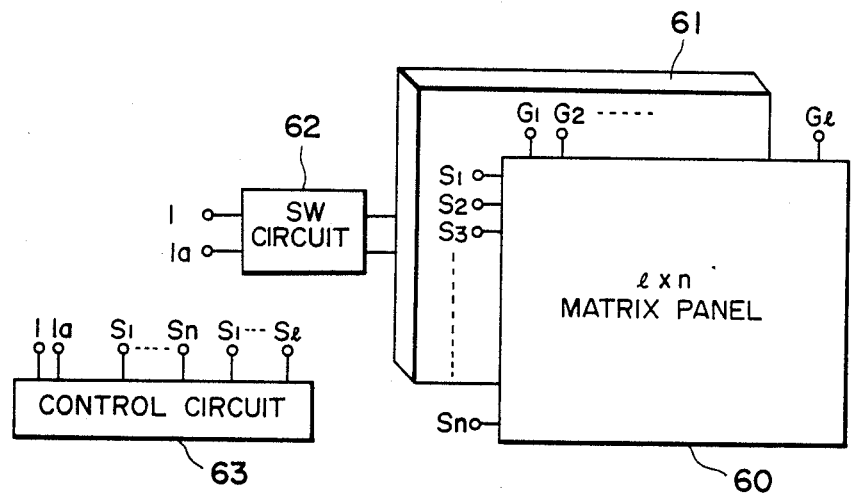
FIG. 6 is a schematic view showing an arrangement of a liquid crystal apparatus according to the present invention.

An embodiment of the present invention is explained with reference to FIGS. 6–8. FIG. 6 is a schematic view showing an apparatus arrangement according to the present invention. Referring to FIG. 6, behind a matrix panel 60 having 1×n picture elements is disposed a backlight 61 composed of a fluorescent lamp which is connected to a switching circuit 62 for ON-OFF switching. Further, there is disposed a control circuit 63 from which driving signals are supplied to scanning signal lines $S_1$–$S_n$ and information signal lines $G_1$–$G_n$, and respective signals to signal lines 1 and 1a of the switching circuit 62.

Figure 8:
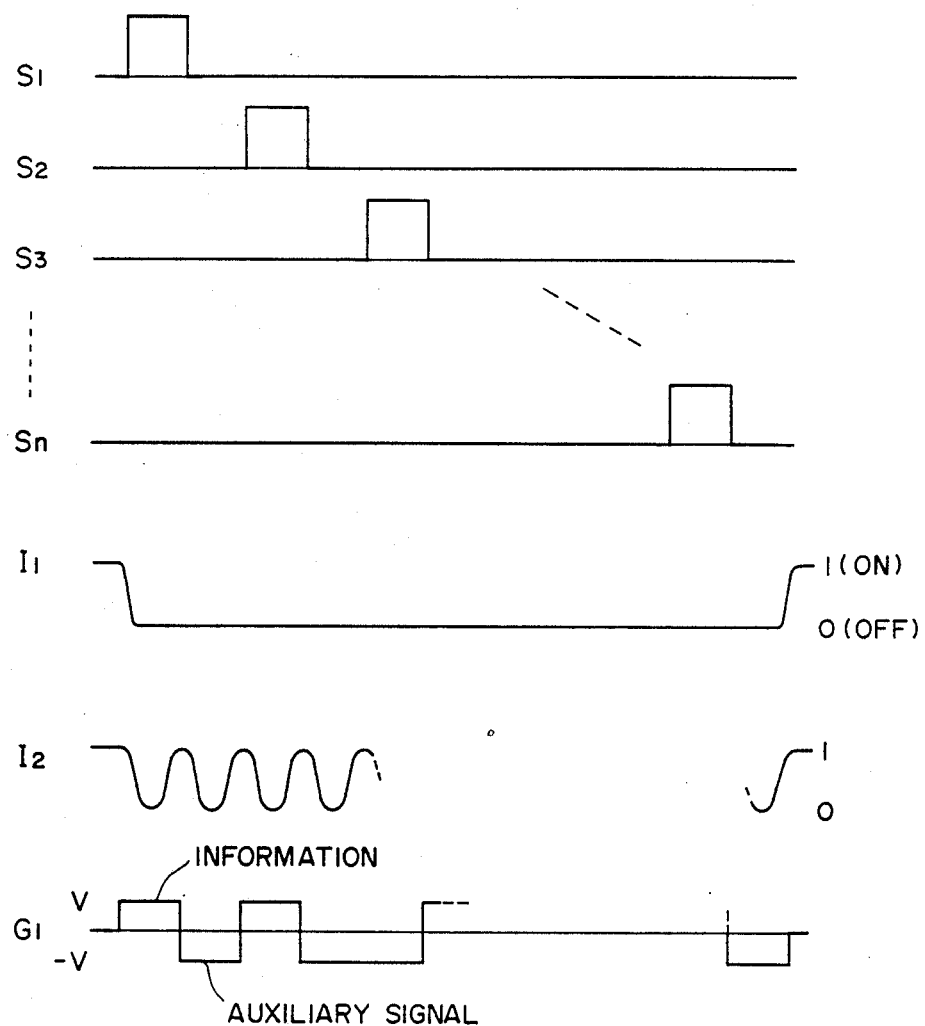
FIGS. 8 and 9 are timing charts showing switching pulses and optical characteristics of a light source in time series.

FIG. 8 shows signal waveforms applied to the scanning signal lines $S_1$–$S_n$ and the information signal line $G_1$ shown in FIG. 6 and light quantity characteristics $I_1$ and $I_2$. The pulses applied to the information signal line $G_1$ are those used in an example of the whole picture clearing-writing mode.

When pulses as shown in FIG. 8 are applied to the scanning signal lines $S_1$–$S_n$ and the information signal line $G_1$, the light source is turned OFF at the timing of supplying the first line scanning signal $S_1$ and is turned ON after the elapse of a prescribed period (as shown at $I_1$) to effect display. In this case, when it is assumed that a period of 4 m.sec. is required for writing one line, a period of 4×n m.sec. is required for scanning n lines. As a result, even when a panel with 100 lines are used for display, flickering during writing is obviated if the light is kept OFF for 400 m.sec.

Further, if a light source having a steep and fast ON-OFF characteristic with respect to light quantity, a good display characteristic may be attained by turning ON and OFF for writing of each m lines ($m \geq 1$).

Figure 7:
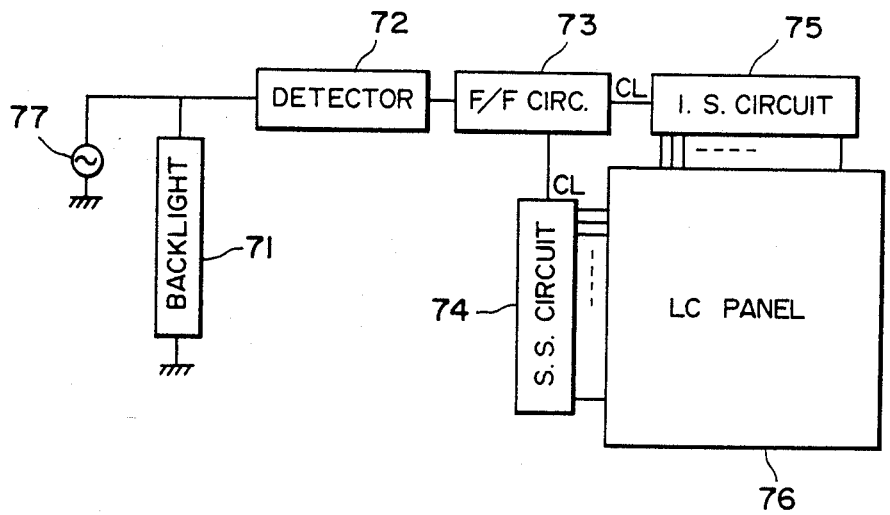
FIG. 7 is a block diagram of the control circuit used in the apparatus shown in FIG. 6.

FIG. 7 shows a block diagram of a control circuit used in this embodiment. The circuit shown in FIG. 7 comprises a backlight 71, a zero-crossing detector circuit 72, a flip-flop (F/F) circuit 73, a scanning signal circuit 74, an information signal circuit 75, a LC panel 76, and a power supply 77. Referring to FIG. 7, the backlight 71 is energized by the power supply 77 to cause a periodical change in light quantity. The electric source signals are transformed into trigger pulses by the zero-crossing detector circuit 72 and then into clock pulses by the F/F circuit 73 to be supplied for driving as scanning signals and information signals for the LC panel. In this way, for example, an operation shown by the combination of FIGS. 5A, 5E and 5F may be accomplished.

The above merely shows one example of circuit arrangement. It is also possible to treat the trigger pulses after the zero-crossing detection with a logic circuit without transforming them into clock pulses. Further, in a case where a fluorescent lamp, for example, is used as a light source, it has been known that the light quantity characteristic thereof does not accord with the voltage waveform of the power supply. In such a case, an appropriate time manipulation may be effected by means of a circuit for optimization.

In accordance with another embodiment of the present invention, a liquid crystal display apparatus of a transmission type comprising a liquid crystal panel of a matrix electrode arrangement and an illumination source of which the light quantity periodically changes, is driven by writing a "dark" or "bright" state at picture elements on a selected scanning line, prior to a period in which the light quantity of the illumination source assumes a minimum. As a result, flickering due to transient overshooting at selected picture elements may be made unnoticeable.

This embodiment is explained with reference to FIGS. 9–11.

Figure 10:
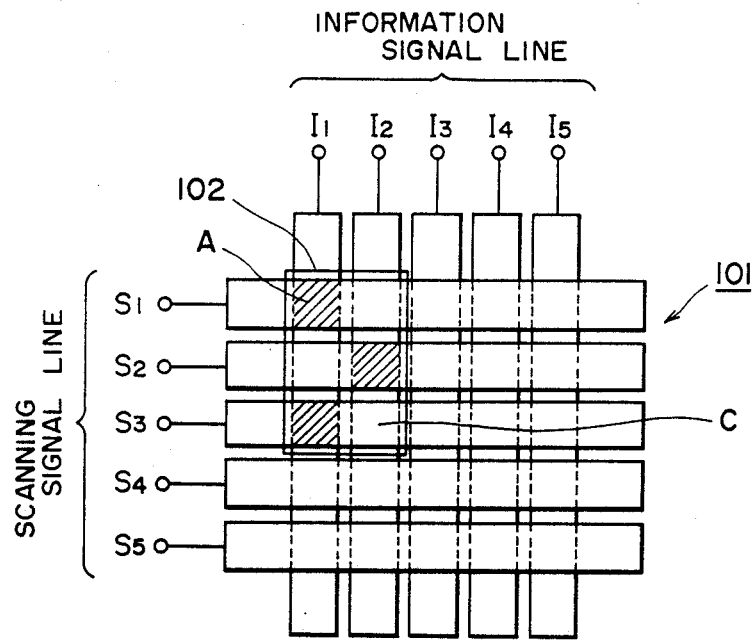
FIGS. 10, 14 and 18 are plan views showing matrix electrodes used in the liquid crystal apparatus according to the present invention.

Referring to FIG. 10, there is schematically shown an liquid crystal device 101 having a matrix electrode arrangement in which a ferroelectric liquid crystal (not shown) is interposed between a pair of electrode groups respectively forming scanning signal lines $S_1$–$S_5$ for sequentially supplying a scanning selection signal and information signal lines $I_1$–$I_5$ for supplying information signals. A hatched area A denotes a picture element in a "dark" state, and a white area C denotes a picture element in a "bright" state.

Figure 9:
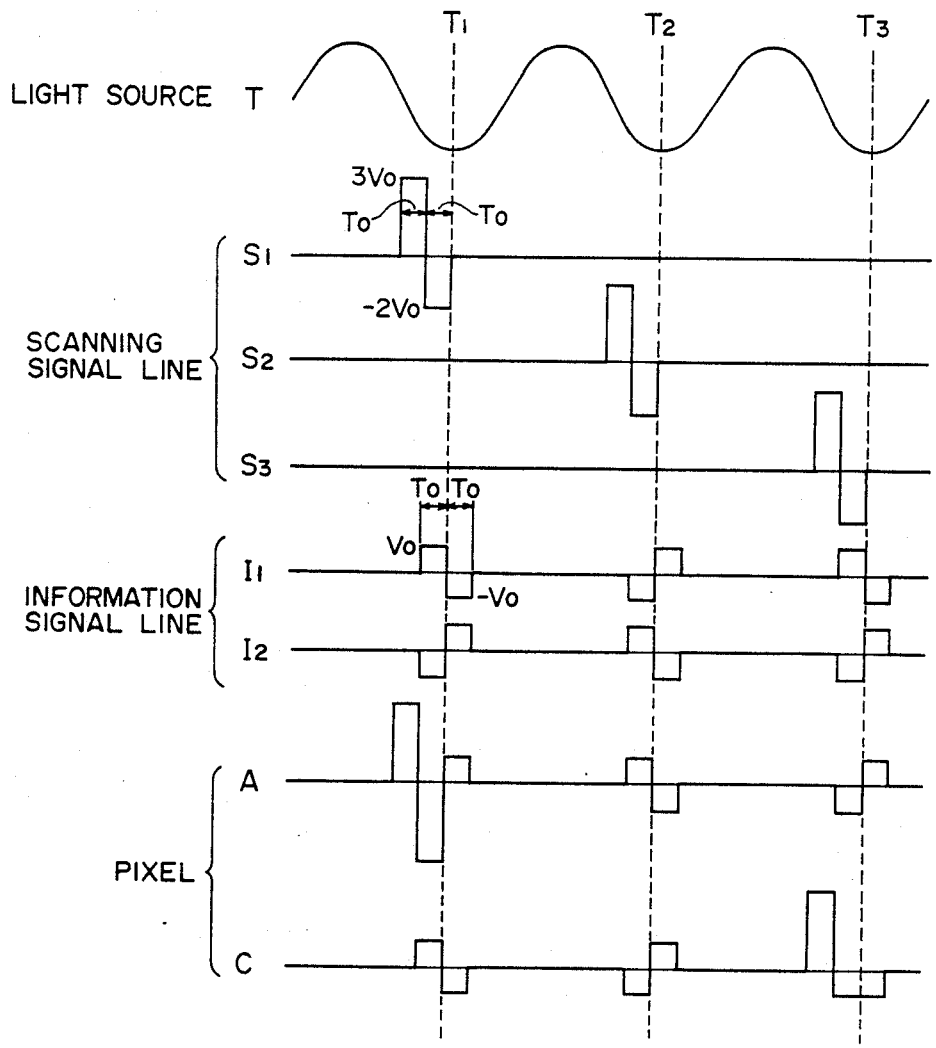

FIG. 9 is a time chart showing voltage waveforms for driving the above mentioned liquid crystal device. In the figure, a curve at T indicates a change in light quantity of an illumination source which is a fluorescent lamp changing the light quantity in a frequency of about 100 Hz. The frequency may be selected at any level as far as the light quantity change cannot be sensed by human eyes due to an afterimage effect. Further, the curves at $S_1$–$S_3$ and $I_1$–$I_2$ in FIG. 9 respectively show an example of voltage waveform applied to the corresponding scanning signal lines and information signal lines in FIG. 10, and the curves at A and C show voltages applied to the corresponding picture elements in FIG. 10. Thus, if the picture elements are so arranged that they assume a "dark" state at a negative voltage and a "bright" state at a positive voltage, display states as shown in a region 102 are produced.

This embodiment adopts a driving mode wherein the picture elements on a selected scanning line are once brought to a "bright" state and then a selection signal of "dark" or "bright" is applied. Referring to FIG. 9, the signal applied to a scanning signal line comprises two pulses of waveheight $3V_0$ and $-2V_0$. When pulse of $3V_0$ is applied to a scanning signal line and an information signal line is placed at 0 V, the corresponding picture element assumes a "bright" state regardless of the previous state thereof. Then, when a pulse of $-2V_0$ is applied to the scanning signal line, an information signal comprising two pulses of waveheight $V_0$ and $-V_0$ is applied to information signal lines. The selection of "dark" or "bright" state is given by the first pulse of the information signal comprising the two pulses, and the second pulse is applied in order to prevent a crosstalk phenomenon which may occur when a same information signal is continually applied. For example, at the picture element A, the voltage difference between the pair of electrodes becomes $-3V_0(=-2V_0-V_0)$ to bring the picture element to "dark" before time $T_1$. On the other hand, at the picture element C, the voltage difference becomes $-V_0(=-2V_0-(-V_0))$ to retain a "bright" state. The pulse durations of the scanning signal and information signal are the same ($T_0$), and the voltage level $V_0$ is so set as to satisfy the following unequation with respect to the threshold $V_{th}$ of the liquid crystal for a pulse with the duration $T_0$ $$V_0 < V_{th} < 3V_0, \text{ or}$$

$$-V_0 < -V_{th} < -3V_0.$$

In this embodiment of the present invention, as shown in FIG. 9, the timing of the scanning signal is so adjusted that the first pulse thereof is applied prior to when the quantity of the backlight assumes a minimum. In this case, the timing of the information signal is so selected that the midpoint of time ($T_1$, $T_2$, ...) between the two pulses coincides with the time at which the light quantity T of the light source assumes the minimum.

Figure 11:
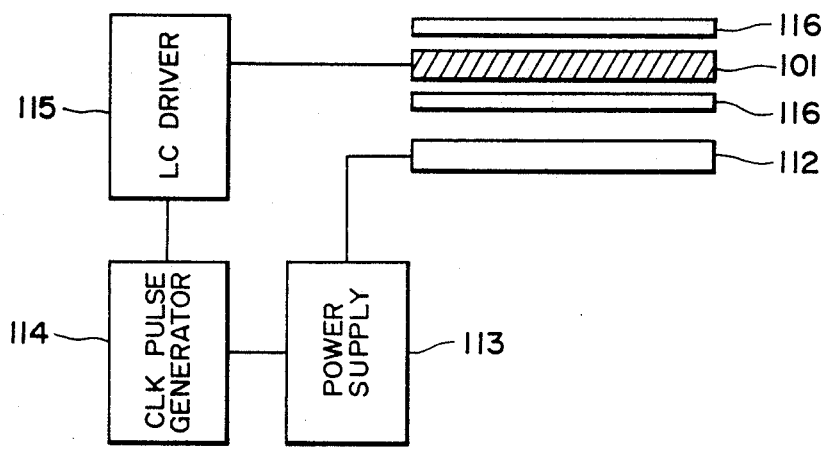
FIG. 11 is a schematic view showing another liquid crystal apparatus according to the present invention.

FIG. 11 is a schematic view showing an arrangement of a liquid crystal display apparatus for practicing this embodiment. In order to synchronize a scanning signal with the light quantity change of an illumination source 112, the clock pulses from a power supply 113 for the illumination source 112 are supplied to a clock pulse generator 114 from which clock pulses are synchronized according the prescribed timing and supplied to a liquid crystal driver circuit 115 for driving a liquid crystal panel 101 sandwiched between polarizers 116 arranged in cross nicols and illuminated with the source 112.

According to the embodiment described above, in addition to the effect of preventing flickering at selected picture elements at the time of writing into a liquid crystal device, the following effects are accomplished.

As described above, in an SSFLC cell having bistability, switching between the bistable states is not effected in response to an electric field below the threshold, so that the liquid crystal molecules remain in the previous stable states. However, this does not mean that the liquid crystal molecules never respond to an electric field E below the threshold. In other words, the liquid crystal molecules are not transformed between the two stable states but considerably respond around the equilibrium point for one stable state to be detected optically as a temporary change in quantity of transmitted light. This phenomenon is problematic especially when writing is effected by line sequential scanning with an SSFLC cell having a matrix arrangement comprising scanning signal lines and information signal lines. Thus, when matrix driving is carried out according to line sequential scanning, an information signal is applied even to picture elements on nonselected scanning lines, so that the liquid crystal molecules respond at all the picture elements on the information signal lines to which an information signal is applied. As the information signal is, of course, set below the threshold, the liquid crystal molecules do not change their orientation states but respond to voltages to cause visual flickering on the picture. Such flickering is problematic, because it extends to the whole picture even when a picture is partially rewritten, i.e., only a part of the scanning lines are driven. According to the present invention, however, all the signals are applied around the instants when the light quantity of the backlight assumes a minimum, and so the flickering at the nonselected picture elements may be suppressed.

According to another embodiment of the present invention, there is provided a liquid crystal display apparatus comprising a ferroelectric liquid crystal panel of a transmission type with a backlight, a driving circuit for the panel, and a display control circuit, wherein the backlight is turned ON and OFF at a high frequency, and a scanning line is energized not immediately after issuance of a display rewriting instruction from the display control circuit but starts to be energized after waiting until the backlight is turned off. In this embodiment, it is desirable that the flashing frequency of the backlight is 100 Hz or higher.

As the scanning is started when the backlight is turned off, at the picture elements at which writing is effected by applying a voltage exceeding a threshold, as a matter of course, and also at picture elements to which a voltage below the threshold is applied, instantaneous change in quantity of transmitted light is not noticeable.

Figure 12:
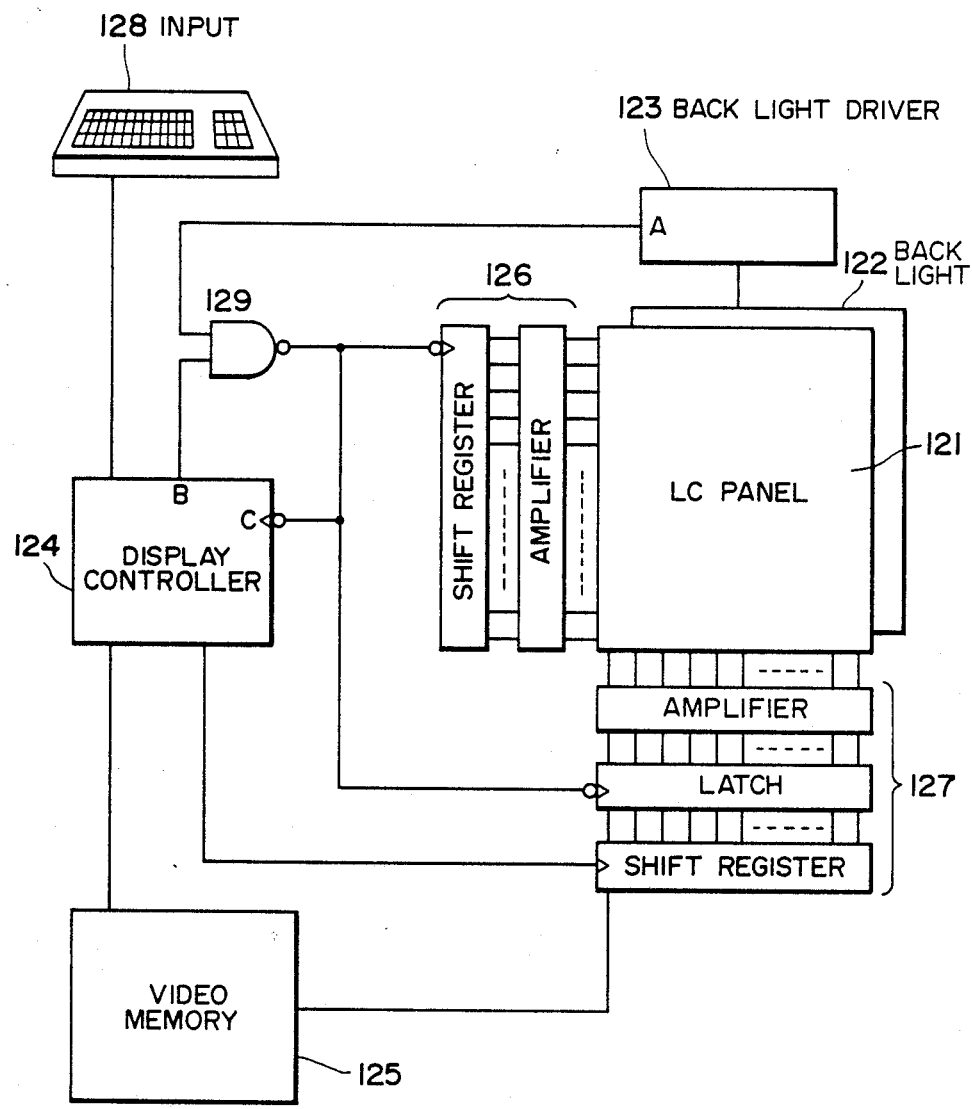
FIG. 12 is a block diagram showing a circuit arrangement used in the apparatus shown in FIG. 11.

FIG. 12 schematically shows an arrangement of a liquid crystal display apparatus according to this embodiment. Referring to FIG. 12, when a writing instruction is supplied from an external input device 128, a display control unit 124 issues a writing state signal from a terminal B. On the other hand, from a terminal A of a backlight driver unit 123, a flashing signal indicating ON and OFF of a backlight 122 for illuminating a LC panel 121 is issued. These two signals are supplied to a gate circuit 129 from which NAND signals are supplied to the shift register of a scanning-side driver unit 126 as shift clock pulses and also to a terminal C of the display control unit 124 and a signal-side driver unit 127 as latch pulses. At the display control unit 124, the rising edges of C-terminal inputs are counted until they reach a prescribed number of scanning lines, when the B-terminal output is brought to a non-writing state. Further, in paralllel with these operations, the display control unit 124 effects an operation of transferring data from a video memory device 125 to the shift register of a signal side driver unit 127.

Figure 13:
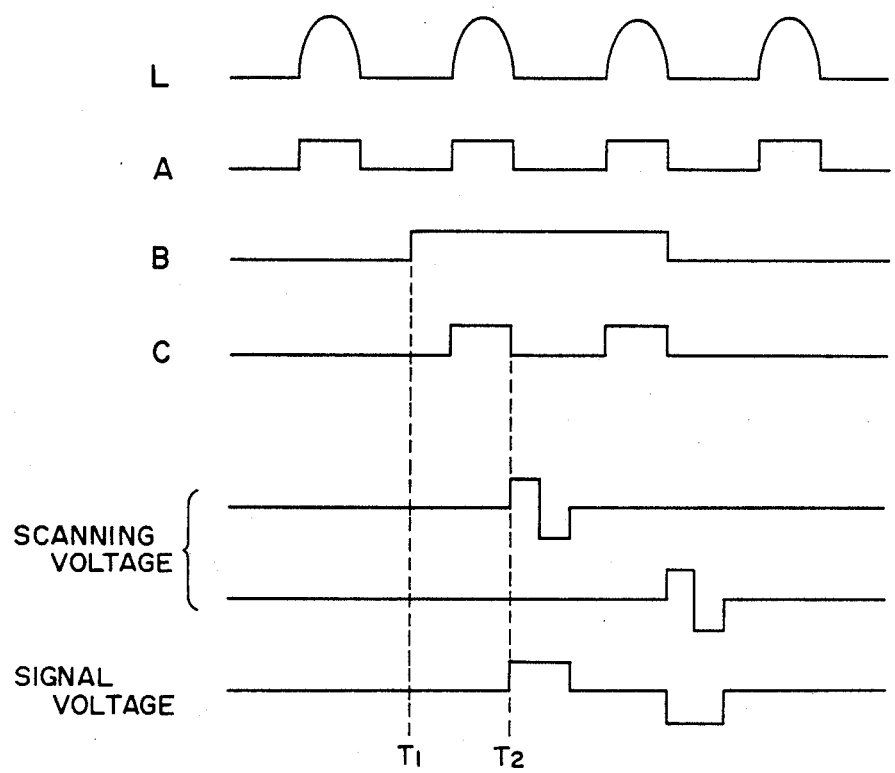
FIG. 13 is a timing chart showing switching pulses and optical characteristics used in the apparatus shown in FIG. 10 in time series.

FIG. 13 is a timing chart showing signals for effecting the above operations. In FIG. 13, a curve at L indicates the luminance of the backlight 122; A indicates a flashing signal issued from the terminal A of the backlight controller unit 123; B indicates writing state signal issued from the terminal B of the display control unit 124; and C indicates an output signal from the gate circuit 129 which is a NAND signal of signals A and B. The terminal C of the display control unit and the latch of the signal-side driver unit 127 are both triggered by the falling edges of the C signals, so that even if a writing state signal is supplied as an external input at time $T_1$, the scanning is started at time $T_2$. In this way, the time of starting scanning is delayed so as to be synchronized with the turning off of the backlight source, whereby the backlight source may be kept extinguished. As a result, the change in transmittance of a liquid crystal cell due to voltage application does not lead to flickering on a picture, thus resulting in an easy-to-see display picture.

The flashing frequency of the backlight is desirably at least 100 Hz, because too low a frequency provides a flickering of the light noticeable to human eyes. As a result, if the flashing duty is set to 50%, the extinguishing period during one cycle becomes 5 m.sec. or shorter, but it is sufficiently possible to complete the scanning in this period, as the responsive speed of a ferroelectric liquid crystal is extremely fast.

Figure 14:
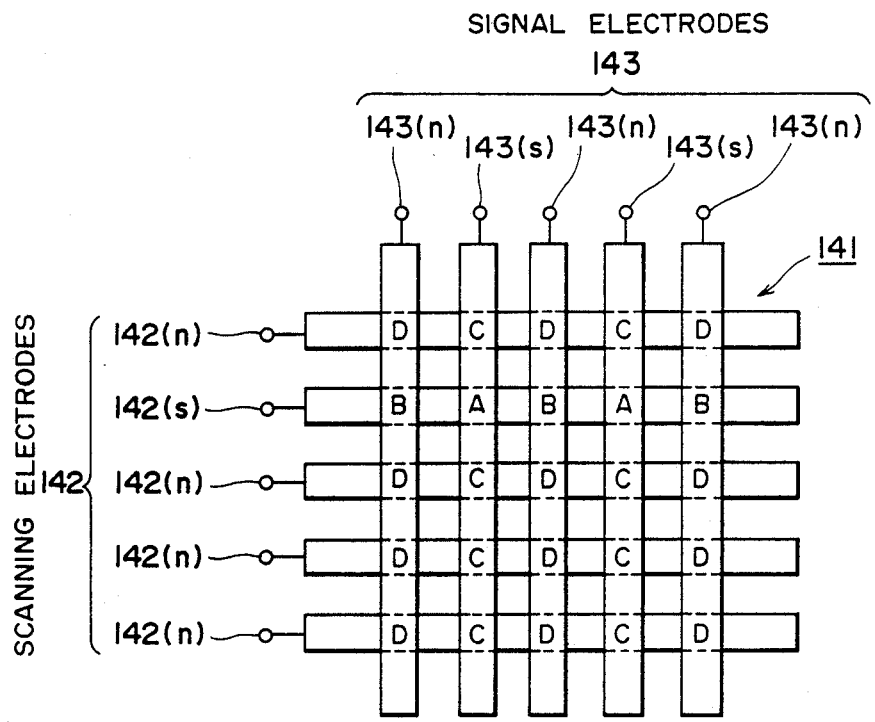
Figure 15A:
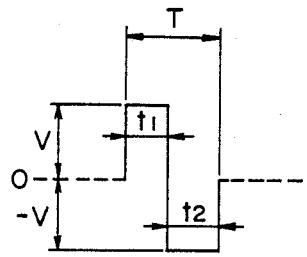
FIGS. 15A–15D show waveforms of driving signals used in the present invention.
Figure 15C:
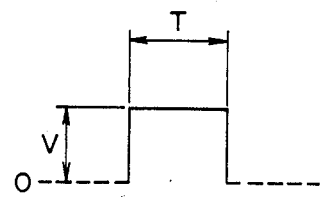
Figure 15B:
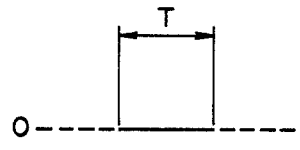
Figure 15D:
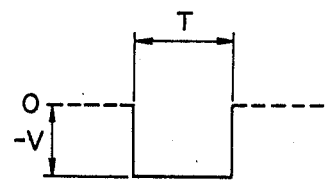

Referring to FIG. 14, there is schematically shown an example of a cell 141 having a matrix electrode arrangement in which a ferroelectric liquid crystal (not shown) is interposed between a pair of groups of electrodes oppositely spaced from each other. Reference numerals 142 and 143 denote a group of scanning electrodes and a group of signal electrodes, respectively. Referring to FIGS. 15A and 15B, there are respectively shown electric signals applied to a selected scanning electrode 142(s) and electric signals applied to the other scanning electrodes (non-selected scanning electrodes) 142(n). On the other hand, FIGS. 15C and 15D show electric signals applied to the selected signal electrode 143(s) and electric signals applied to the non-selected signal electrodes 143(n), respectively. In FIGS. 15A to 15D, the abscissa and the ordinate respresent time and voltage, respectively. For instance, when displaying a motion picture, the group of scanning electrodes 142 are sequentially and periodically selected. If a threshold voltage for giving a first stable state of the liquid crystal having bistability is referred to as $V_{th1}$ and a threshold voltage for giving a second stable state thereof as $-V_{th2}$, respectively, an electric signal applied to the selected scanning electrode 142(s) is an alternating voltage showing V at a phase (time) $t_1$ and $-V$ at a phase (time) $t_2$, as shown in FIG. 15A. On the other hand, the other scanning electrodes 142(n) are grounded as shown in FIG. 15B. Accordingly, the electric signals appearing thereon show zero volt. Further, an electric signal applied to the selected signal electrodes 143(s) shows V as indicated in FIG. 15C, while an electric signal applied to the non-selected signal electrodes 143(n) shows $-V$ as indicated in FIG. 15D. In this instance, the voltage V is set to a desired value which satisfies $V < V_{th1} < 2V$ and $-2V < -V_{th2} < -V$. Voltage waveforms applied to respective picture elements A, B, C and D shown in FIG. 14, when such electric signals are given, are shown in FIGS. 16A, 16B, 16C and 16D, respectively. Namely, as seen from FIG. 16A, a first signal voltage of 2 V above the threshold level $V_{th1}$ is applied at the picture elements A on the selected scanning line at a phase $t_2$. Further, a second signal voltage of $-2$ V exceeding the threshold level $-V_{th2}$ is applied at the picture elements B on the same scanning line at a phase $t_1$. Accordingly, depending upon whether a signal electrode is selected or not on a selected scanning electrode line, the orientation of liquid crystal molecules changes. Thus, when a certain signal electrode is selected, the liquid crystal molecules are oriented to the first stable state, while when not selected, are oriented to the second stable state. In either case, the orientation of the liquid crystal molecules is not related to the previous states of each picture element.

Figure 16A:
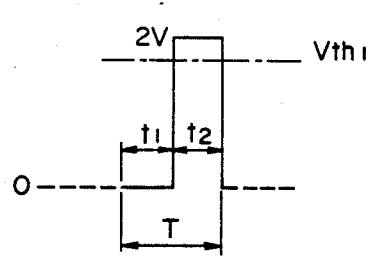
FIGS. 16A–16D show waveforms of signals applied to picture elements.
Figure 16C:
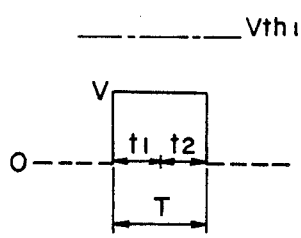
Figure 16B:
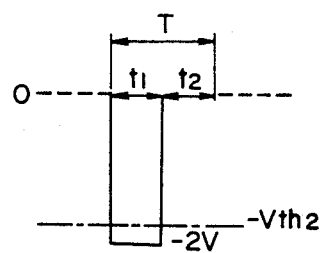
Figure 16D:
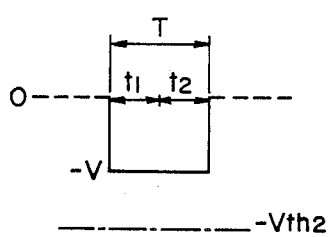

On the other hand, as shown in FIGS. 16C and 16D, a voltage applied to all the picture elements on the non-selected scanning lines is $+V$ or $-V$, each not exceeding the threshold level. Accordingly, the liquid crystal molecules at the respective picture elements on the non-selected scanning lines are placed in the orientations corresponding to signal states produced when they have been last scanned without change in orientation.

As explained above, in this embodiment of the present invention, the backlight is turned on and off at a constant frequency, and the driving circuit is actuated to drive the panel, after the display control circuit has issued a writing instruction and after waiting for a timing at which the backlight assumes an extinguished state, whereby flickering on the picture due change in transmittance during driving of the liquid crustal panel is obviated to provide a display apparatus giving an easy-to-see picture.

According to still another embodiment of the present invention, there is provided a driving method, wherein pulses are applied to a plurality of scanning signal lies in a period when a backlight is extinguished or after the light quantity of the backlight attenuates by a prescribed proportion from the maximum thereof, i.e., in a relatively dark period, and pulses are not applied when the backlight is energized or in a relatively bright period.

In the present invention, as the pulses are applied to scanning signal lines to select picture elements in a period when the backlight is extinguished or in a relatively dark period before or after the extinguishing period, flickering at non-selected picture elements becomes unnoticeable. Furthermore, in this instance, pulses are applied to a plurality of scanning signal lines, so that the total time required for selection of picture elements on one whole picture becomes shorter.

Figure 17:
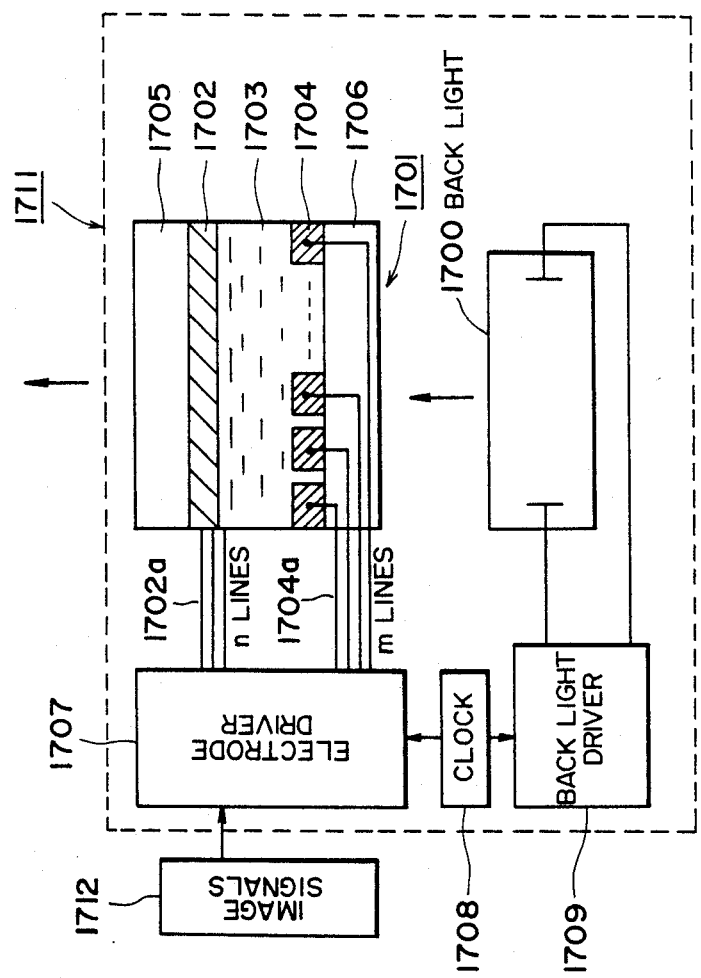
FIG. 17 is a schematic view illustrating the arrangement of another liquid crystal apparatus according to the present invention.
Figure 18:
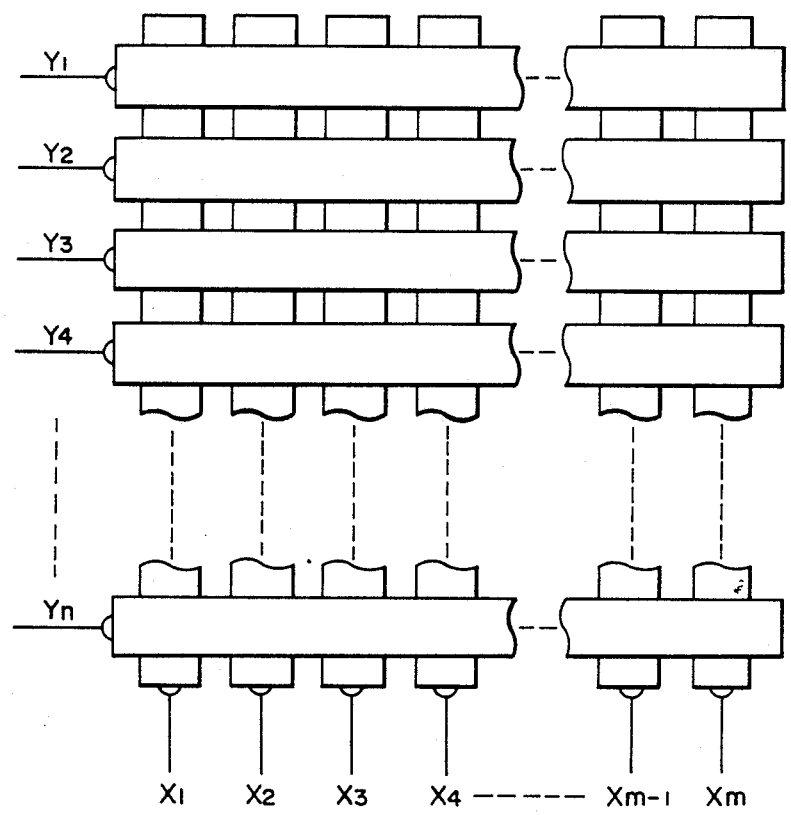

FIG. 17 schematically shows a basic structure of a display apparatus according to this embodiment. More specifically, FIG. 17 shows an arrangement of a ferroelectric liquid crystal display apparatus 1711 of a transmission type. The display apparatus 1711 comprises a LC panel 1701 which in turn comprises glass substrates 1705 and 1706 provided with scanning electrodes 1702 and display electrodes 1703, respectively, in the form of stripes. The scanning electrodes 1702 and display electrodes 1703 are so disposed as to cross each other at right angles and to sandwich a ferroelectric liquid crystal layer 1703. In connection with the LC panel 1701, there are schematically shown scanning signal lines 1702 (1702a, ...) and display signal lines 1704 (1704a, ...). The display apparatus further comprises an electrode driver circuit 1707, a backlight 1700, a backlight driver circuit 1709 for driving the backlight 1700, and a clock 1708 for synchronizing respective driving signals to the electrode driver circuit 1707 and the backlight driver circuit 1709. As described above, in this embodiment, electrode synchronization is effected so that the electrodes are driven in the extinguishing period or a relatively dark period of the backlight 1700. To the liquid crystal apparatus are supplied image signals 1712 from outside. FIG. 18 is a plan view showing an arrangement of the electrodes in the LC panel 1701. In FIG. 18, $Y_1$-$Y_n$ denote scanning electrodes and $X_1$-$X_m$ denote display electrodes, by which m×n picture elements are provided.

Figure 19:
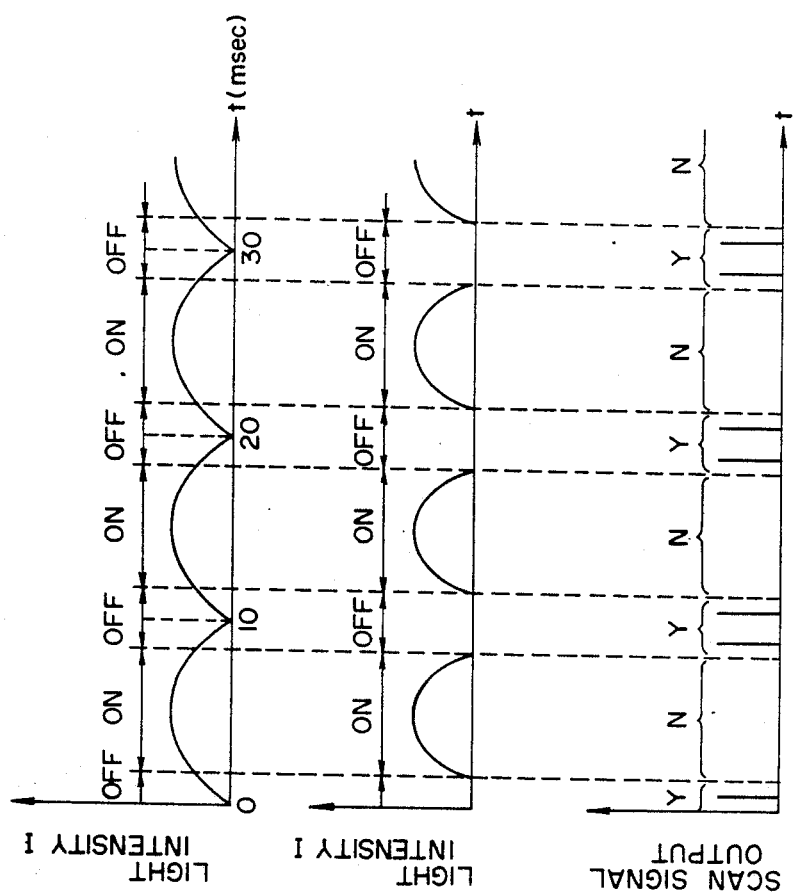
FIG. 19 is a timing chart showing a relationship between the ON-OFF operation of a backlight and scanning signals.

The driving method according to this embodiment is explained with reference to FIGS. 19A-19C. FIGS. 19A-19C in combination show a relationship between the flashing of a backlight (fluorescent lamp) and a scanning signal. In the figure, "OFF" indicates a period in which the backlight 1700 is extinguished or the light quantity is decreased to or below a prescribed level below the maximum luminance level, e.g., below 50% preferably below 30% of the maximum light quantity in the course of change in light quantity of the backlight, while "ON" indicates a period in which the backlight is energized or the light quantity increased to or above a prescribed level, e.g., 50% or above, preferably 70% or above, of the maximum light quantity in the course of change in light quantity of the backlight. FIG. 19A shows the change in light quantity for flashing of an ordinary fluorescent lamp, more specifically, the change in light intensity (ordinate) versus the elapsed time (abscissa). FIG. 19A shows that the light intensity of the backlight is weakened when the alternating voltage applied by the backlight driver circuit 1709 crosses the zero potential level. The waveform can vary to some extent depending on the kind of the backlight driver 1709. In contrast thereto, FIG. 19B shows a waveform obtained by controlling the flashing by the above-mentioned clock or clock pulses. Further, FIG. 19C is a time chart showing the presence (Y) or absence (N) of a scanning signal. As will be understood from the figure, this embodiment is characterized in that a plurality of scanning signals are supplied during the "OFF" period of the backlight 1700, and in this particular example, two scanning signals are issued.

Then, a specific driving embodiment is explained with reference to FIG. 20 which is a time chart of applied voltage waveforms for driving a LC panel shown in FIG. 18. The time chart corresponds to a characteristic of a ferroelectric liquid crystal. More specifically, when a ferroelectric liquid crystal is used, the bright or dark state of a display picture element is selected by the direction of an electric field applied thereto, and the resultant selected state is retained even after the electric field is removed, i.e., a memory characteristic exists. For this reason, in a driving example shown in FIG. 20, prior to selection of "bright" or "dark" state of one row of picture elements, a voltage or electric field of $(3V_0-0)/d$ is applied in the direction of Y→X by setting a scanning electrode at a potential of $3V_0$ and a display electrode at a potential of 0, thus uniformly bringing the whole picture elements on the row to the "bright" state, wherein d denotes the difference between the electrodes.

Figure 20:
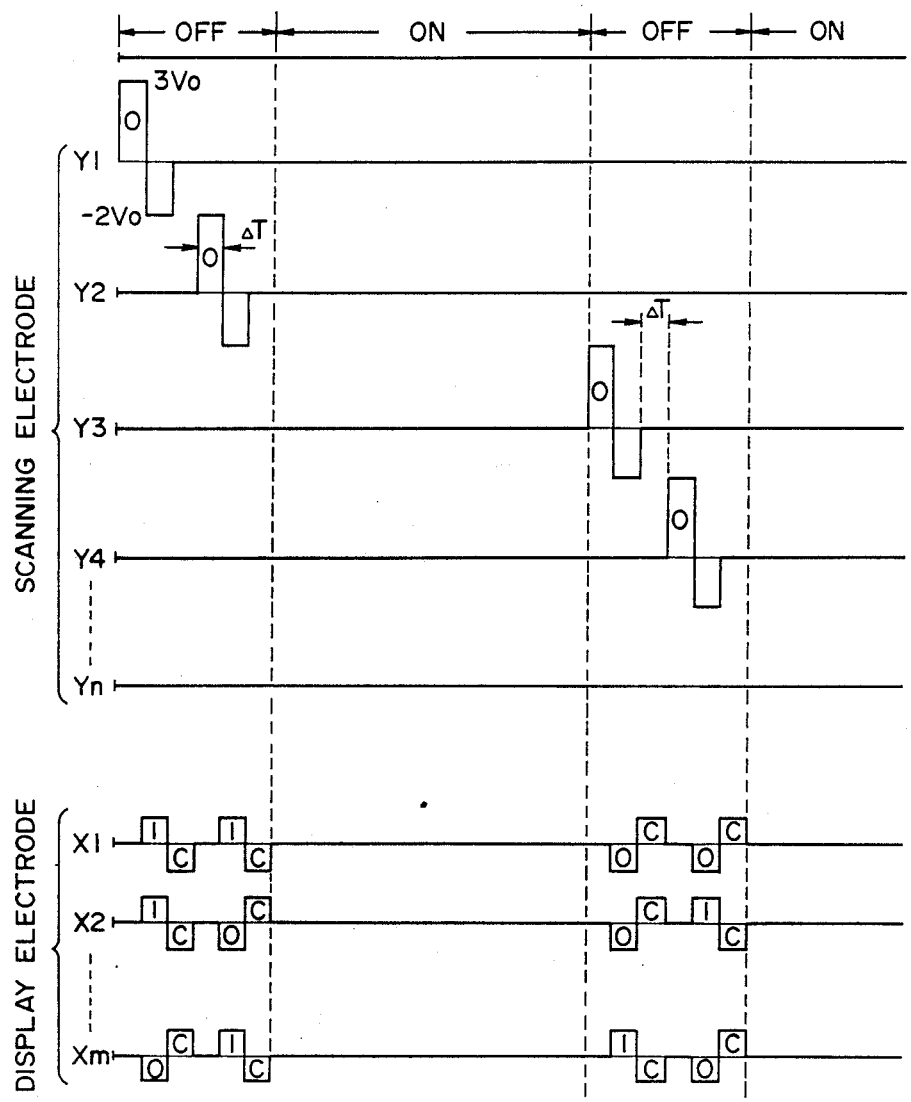
FIG. 20 is a timing chart showing a relationship between the ON-OFF operation of a backlight and applicaton voltages.

After one row of picture elements are made "bright" according to the above operation, the potential of the scanning electrode is changed from $3V_0$ to $-2V_0$ while the potential of an opposite display electrode is controlled to either one of two states, i.e., "dark" ("1" in FIG. 20) and "bright" ("0" in FIG. 20). As a result, when "dark (1)" is selected by placing a display electrode at a potential at $+V_0$, an electric field of $(-2V_0-V_0)/d$ is applied in the direction of Y→X. In this case, the electric field is opposite to that used in the previous operation for selecting "bright", whereby the picture element is inverted to be written in "dark". On the other hand, when "bright (0)" is selected by placing a display electrode at a potential of $-V_0$, an electric field of $[-2_0-(-V_0)]/d = -V_0/d$ (below the threshold) is applied, whereby the "bright" state selected in the previous operation is retained.

Incidentally, the pulse accompanied with "C" in FIG. 20 is a pulse for preventing crosstalk which has a polarity opposite to that of the pulse "1" or "0" preceding thereto so as to compensate for the biasing of the electric field.

In the above explained example, two scanning lines are selected in the "OFF" period of the backlight, but more scanning lines may be selected to further shorten the time required for selection of all the picture elements on one picture As described above, in this embodiment according to the present invention, pulses are supplied to a plurality of scanning lines in the "OFF" period or a relatively dark period of the backlight and no pulses are applied in the "ON" period or a relatively bright period of the backlight, whereby the flickering of the display picture is synchronized with the flashing of the backlight to provide an improved easy-to-see picture, and moreover, the selection of picture elements on the whole picture area may be completed in a short time.

According to another embodiment of the present invention, there is provided a liquid crystal apparatus comprising a liquid crysta-light valve, an illuminant, means for controlling the light quantity issued from the illuminant, and means for detecting data concerning a change in light quantity of the illuminant and issuing the data in the form of an electric signal to the exterior. More specifically, a power supply voltage is partly divided to be an electric signal corresponding to the change in light quantity of the illuminant. Further in this embodiment, the liquid crystal light valve may preferably be composed of a ferroelectric liquid crystal device.

According to this embodiment, the change in light quantity of an illuminant itself is monitored and a trigger signal is issued based on an electric signal corresponding to the change in light quantity, whereby the timing for driving the illuminant and that for driving the light valve may be accurately correlated.

Figure 21:
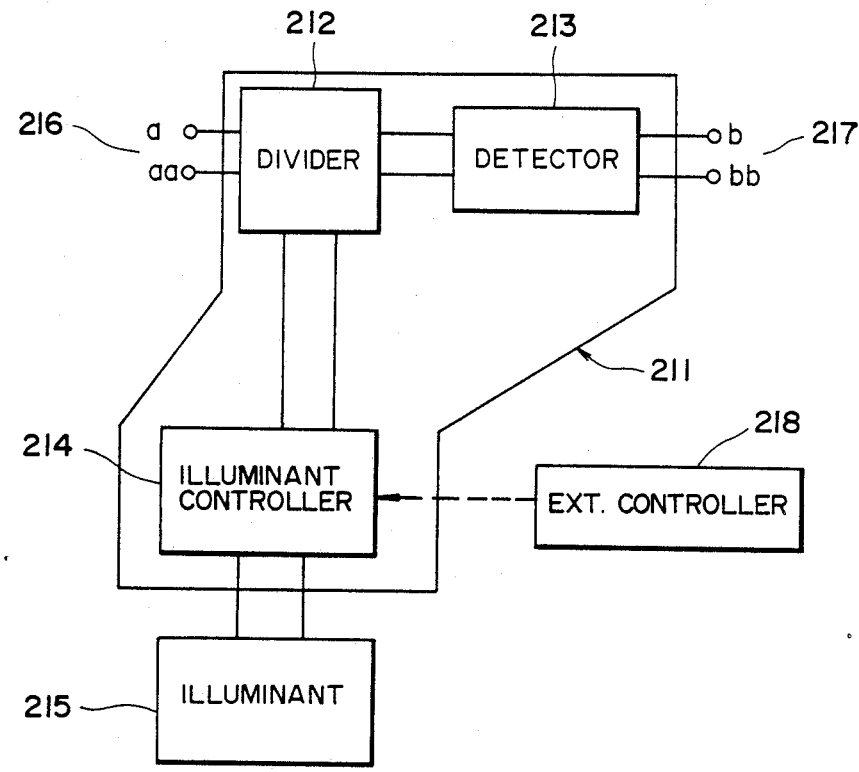
FIG. 21 is a schematic view showing an arrangement of an illumination apparatus.

FIG. 21 is a schematic arrangement view of an illumination apparatus used. Referring to FIG. 21, the illumination apparatus comprises an illuminant power supply circuit 211 and an illuminant 215. The illuminant power supply circuit comprises an illuminant drive controller unit 214 for controlling the light quantity emitted from the illuminant 215, and means for detecting data concerning the change in light quantity and sending out the data as an electric signal to the exterior comprising a voltage divider circuit 212 and a detector circuit 213.

Figure 22:
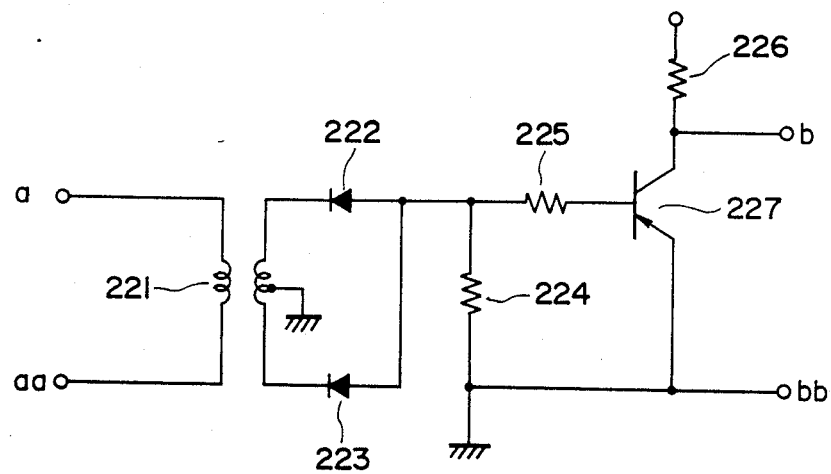
FIG. 22 is a detector circuit diagram.

The circuit of the above construction is designed to monitor the power supply voltage and to indirectly take out a change in light quantity and is suitable especially when a fluorescent lamp is used as a light source. An example of construction of the detector circuit 213 in the illuminant power supply circuit 211 is shown in FIG. 22. The detector circuit shown in FIG. 22 is a full-wave rectifier circuit comprising a transformer 221 diodes 222 and 223, resistors 224, 225 and 226, and a transistor 227. The detector circuit may alternatively comprise a clipping circuit or a Schmidt trigger circuit.

The operation of the apparatus will now be explained with reference to FIG. 2. Referring to FIG. 21, when an alternating voltage is supplied to the power supply input terminal 216 of the voltage divider circuit 212, a part of the voltage supplied to the illuminant driver unit 214 is divided by the divider 212 and sent to the detector circuit 213. In the detector circuit 213 such as a full-wave rectifier circuit as described above, the divided voltage is transformed into a signal voltage in the form of clock pulses to be issued from the clock pulse output terminal 217. Incidentally, instead of the above construction, it is possible to adopt such a construction that an external control circuit 218 may be provided to the illumination power supply circuit 211 so as to supply signals for controlling the frequency, voltage, current, etc.

Figure 23:
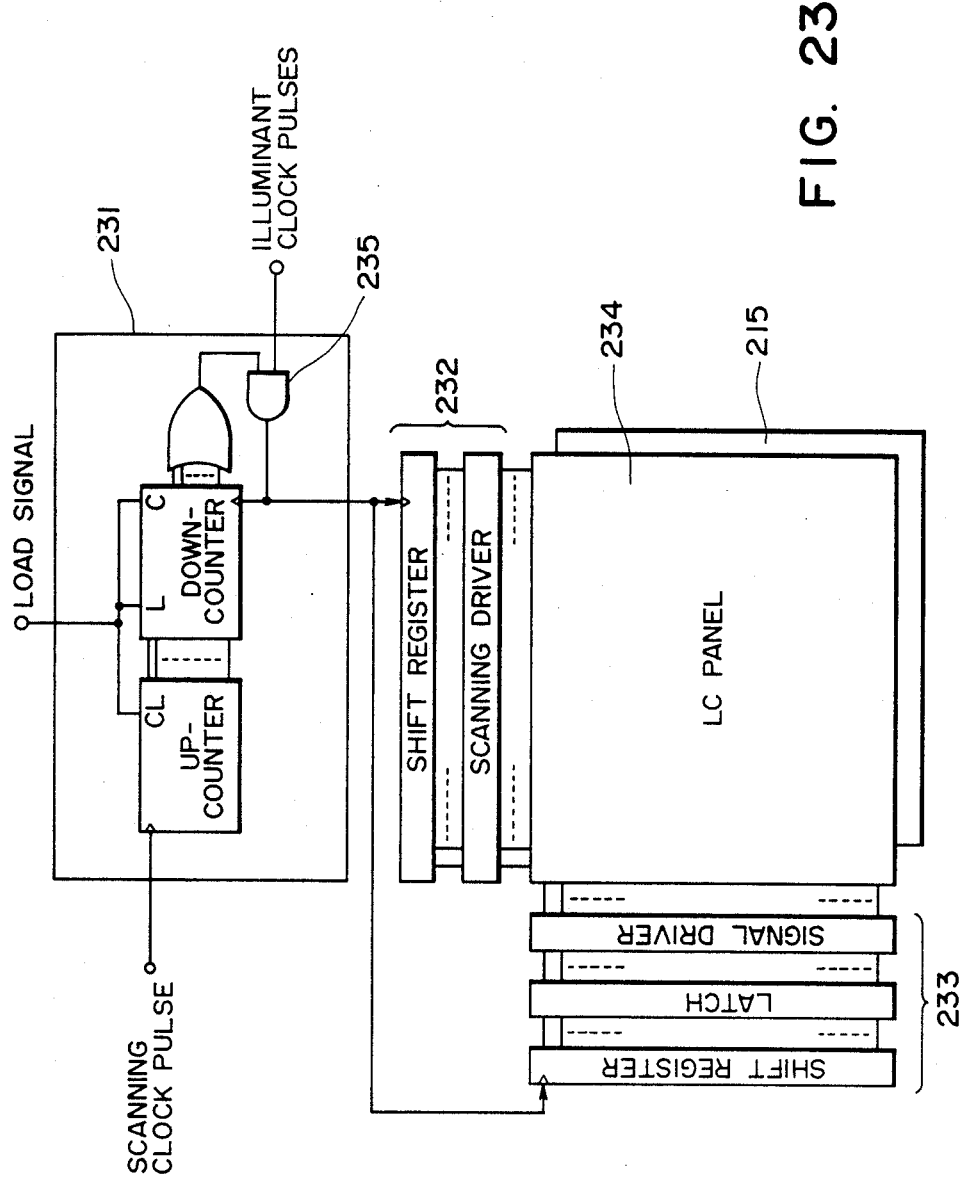
FIG. 23 is a view showing an overall arrangement of another apparatus according to the present invention.

FIG. 23 shows an overall arrangement of a liquid crystal apparatus. By using an illumination apparatus as shown in FIG. 21 and correlating the ON-OFF timing of the illuminant and the timing of the application of scanning signals by using an arrangement shown in FIG. 23, writing may be effected in the "dark" period of the illuminant.

This operation is explained with reference to FIG. 23. In FIG. 23, a block 231 is a synchronizing circuit unit for sending out synchronizing signals respectively to a scanning side driver unit 232 and a signal side driver unit 233, which supply respective signals to a ferroelectric liquid crystal panel 234. Behind the panel is disposed an illuminant 215 which is the same as shown in FIG. 22. In FIG. 23, the illuminant driver circuit 211 is omitted from showing.

First, scanning signal clock pulses are supplied to the up-counter in the synchronizing circuit unit, and the number of supplied clock pulses is counted by the up-counter in a period when the illuminant is energized. Then, a first load signal is supplied to set a down-counter to issue an output in a period when the illuminant is extinguished and the shift the scanning side shift register by one step. This operation is repeated to write in picture elements at periods when the illuminant is extinguished or in a relatively dark state.

Incidentally, the synchronizing circuit unit 231 contains an AND circuit 235 as a gate circuit for turning off the illuminant clock pulses when no data are supplied to the down-counter. Tare not are down-counter is re-loaded by a carry signal for the down-counter, and then the up-counter is cleared. This period is made sufficiently shorter than the scanning signal clock pulse. Further, the synchronizing unit 231 may be made integral with the illumination apparatus or may be separately formed or attached to the panel side.

As described above, according to the present invention, the change in light quantity of the illuminant or light source itself is monitored and is put out to the exterior, so that the timing of the illuminated and timing of the LC-light valve may be correlated optimally, whereby the display quality may be improved.

What is claimed is:

1. A liquid crystal apparatus, comprising:
    a liquid crystal panel comprising a plurality of scanning lines, a plurality of information signal lines, and an plurality of picture elements disposed along each of the scanning lines and comprising a ferroelectric liquid crystal;
    a backlight disposed behind the liquid crystal panel for illuminating the liquid crystal panel, said backlight changing the light quantity emitted therefrom with the lapse of time at least between a low level and a high level; and
    means for synchronizing the low level of the light quantity of the backlight with a writing period when a selection scanning signal is sequentially applied to said scanning lines in phase with information signals to provide a writing voltage signal of one or the other polarity exceeding a threshold of the ferroelectric liquid crystal, a nonwriting voltage not exceeding the threshold being applied in a nonwriting period when at least one of the selection scanning signal and the information signal is not applied to the signal lines, and wherein the light quantity assumes the high level when both the selection scanning signal and the information signal are not applied to the signal lines.

2. A liquid crystal apparatus according to claim 1, wherein said backlight is a fluorescent lamp.

3. A liquid crystal apparatus according to claim 1, wherein said ferroelectric liquid crystal is a chiral smectic liquid crystal.

4. A liquid crystal apparatus according to claim 3, wherein said chiral smictic liquid crystal is formed in a thickness small enough to release the spiral structure.

5. A liquid crystal apparatus according to claim 1, wherein said backlight periodically changes the light quantity emitted therefrom between the high level and the low level.

6. A liquid crystal apparatus according to claim 5, which comprises means for detecting data concerning the high level and the low level of the light quantity of the backlight.

7. A liquid crystal apparatus according to claim 5, which comprises means for detecting data concerning the high level and the low level of the light quantity of the backlight and taking out the data to the exterior in the form of an electric signal.

8. A liquid crystal apparatus, comprising:
    a liquid crystal panel comprising a matrix electrode arrangement including scanning signal lines and information signal lines defining picture elements, and a ferroelectric liquid crystal material interposed between the scanning signal lines and the information signal lines;
    an illumination source periodically changing the light quantity emitted therefrom between a maximum and a minimum value; and means for sequentially applying a selection scanning signal to said scanning lines in phase with information signals in a writing period when the light quantity assumes the minimum value to provide a writing voltage signal of one or the other polarity exceeding a threshold of the ferroelectric liquid crystal, a nonwriting voltage not exceeding the threshold being applied in a nonwriting period when at least one of the selection scanning signal and the information signal is not applied to the signal lines, and wherein the light quantity assumes the maximum value when both the selection scanning signal and the information signal are not applied to the signal lines.

9. A liquid crystal apparatus according to claim 8, wherein said ferroelectric liquid crystal is a chiral smectic liquid crystal.

10. A liquid crystal apparatus according to claim 9, wherein said chiral smectic liquid crystal is formed in a thickness small enough to release the spiral structure.

11. A liquid crystal apparatus comprising:
a ferroelectric liquid crystal panel of a transmission type matrix arrangement provided with scanning signal lines and information signal lines;
a backlight disposed behind the panel changing its output light quantity with the lapse of time; and
means for sequentially applying a selection scanning signal to said scanning lines in phase with information signals in a writing period when the light quantity assumes the minimum value to provide a writing voltage signal of one or the other polarity exceeding a threshold of the ferroelectric liquid crystal, a nonwriting voltage not exceeding the threshold being applied in a nonwriting period when at least one of the selection scanning signal and the information signal is not applied to the signal lines, and wherein the light quantity assumes the maximum value when both the selection scanning signal and the information signal are not applied to the signal lines.

12. A liquid crystal apparatus according to claim 11, wherein said ferroelectric liquid crystal is a chiral smectic liquid crystal.

13. A liquid crystal apparatus according to claim 12, wherein said chiral smectic liquid crystal is formed in a thickness small enough to release the spiral structure.

14. A liquid crystal apparatus comprising:
a ferroelectric liquid crystal panel of a transmission type matrix arrangement provided with scanning signal lines and information signal lines;
a backlight disposed behind the panel changing its output light quantity with the lapse of time; and
means for sequentially applying a selection scanning signal to said scanning lines in phase with information signals in a writing period when the light quantity assumes the minimum value to provide a writing voltage signal of one or the other polarity exceeding a threshold of the ferroelectric liquid crystal, a nonwriting voltage not exceeding the threshold being applied in a nonwriting period when at least one of the selection scanning signal and the information signal is not applied to the signal lines, and wherein the light quantity assumes the maximum value when both the selection scanning signal and the information signal are not applied to the signal lines, wherein the average light quantity in the writing period is 30%, or below, of the maximum value.

15. A liquid crystal apparatus comprising:
a ferroelectric liquid crystal panel of a transmission type matrix arrangement provided with scanning signal lines and information signal lines;
a backlight disposed behind the panel changing its output light quantity with the lapse of time; and
means for sequentially applying a selection scanning signal to said scanning lines in phase with information signals in a writing period when the light quantity assumes the minimum value to provide a writing voltage signal of one or the other polarity exceeding a threshold of the ferroelectric liquid crystal, a nonwriting voltage not exceeding the threshold being applied in a nonwriting period when at least one of the selection scanning signal and the information signal is not applied to the signal lines, and wherein the light quantity assumes the maximum value when both the selection scanning signal and the information signal are not applied to the signal lines, wherein the average light quantity in the writing period is 30%, or below, of the maximum value.

16. A liquid crystal apparatus comprising:
a ferroelectric liquid crystal panel of a transmission type matrix arrangement provided with scanning signal lines and information signal lines;
a backlight disposed behind the panel changing its output light quantity with the lapse of time; and
means for sequentially applying a selection scanning signal to said scanning lines in phase with information signals in a writing period when the light quantity assumes the minimum value to provide a writing voltage signal of one or the other polarity exceeding a threshold of the ferroelectric liquid crystal, a nonwriting voltage not exceeding the threshold being applied in a nonwriting period when at least one of the selection scanning signal and the information signal is not applied to the signal lines, and wherein the light quantity assumes the maximum value when both the selection scanning signal and the information signal are not applied to the signal lines, wherein the average light quantity in the nonwriting is 70%, or above, of the maximum value.

* * * * *